June 16, 1942.  Ö. RISZDORFER  2,286,833

PHOTOGRAPHIC APPARATUS

Filed July 22, 1939

ÖDÖN RISZDORFER
INVENTOR

BY Frank S. Appleman

ATTORNEY.

Patented June 16, 1942

2,286,833

UNITED STATES PATENT OFFICE 2,286,833

PHOTOGRAPHIC APPARATUS

Ödön Riszdorfer, Budapest, Hungary

Application July 22, 1939, Serial No. 286,019
In Hungary July 23, 1938

1 Claim. (Cl. 88—23)

The invention relates to a photographic roll film camera with electric exposure meter built in. The substance of the invention consists in that the photo-electric cell is built into a folding camera in such a manner that in the closed condition of the camera the photo-electric cell is screened against any incidence of light, whilst in the opened condition of the camera it is the camera running base capable of being tilted open i. e., the bed, that protects the photoelectric cell against undesirable vertically incident light.

According to the invention, it is also possible to provide light screens on both sides of the photoelectric cell, which in the closed condition of the camera are covering the photo-electric cell and are in case of opening the camera pivoted into a position in which they are screening the photo-electric cell against lateral light. By utilizing the folding bed as a light screen and the light screens arranged on both sides of the photo-electric cell it is ensured that it is substantially only from the object to be photographed that rays of light will fall on the photo-electric cell.

As, usually, it is the ground or, in general, dark objects that are situated below the photographic camera, from which objects no intense light is radiated, a light screen screening the photo-electric cell from below can be dispensed with.

By keeping away the upper and lateral light not coming from the object to be photographed, it is insured that it is substantially only the light coming from the object to be photographed that is used for measurement by the photo-electric cell.

Further, it is possible according to the invention to arrange the photo-cell in or on the camera bed, the light coming from the object to be photographed falling on the photo-electric cell either directly or through the aid of a mirror.

A few embodiments, shown by way of example of cameras according to the invention are represented on the accompanying drawing, in which.

In all figures similar parts are marked with identical reference marks.

Figure 1:
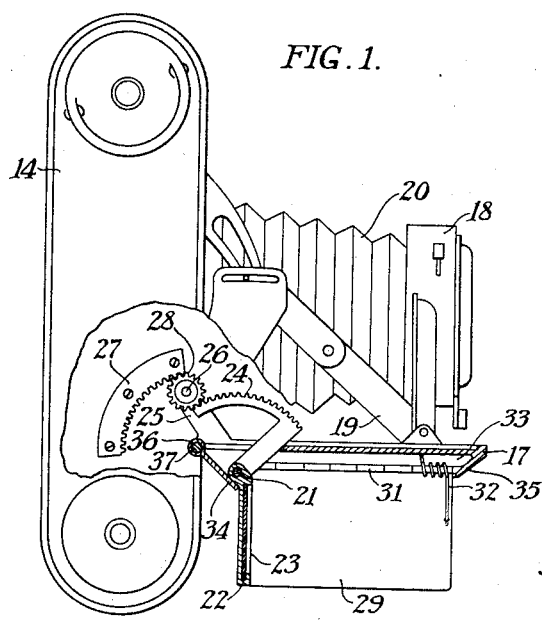
Fig. 1 is a side elevation and Fig. 2 a front elevation of one embodiment.
Figure 2:
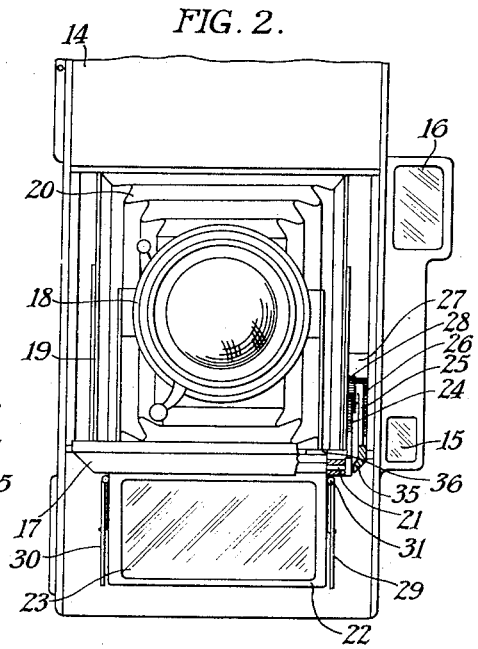

In the embodiment shown in Figs. 1 and 2 a folding type roll-film camera 14 is provided with a combined range and view finder having entrance windows 15 and 16. The folding bed 17 as is well known, forms a support for the objective lens socket 18, its associated bellows 20 and the supporting struts 19.

In the folding bed 17 there is provided an axle 21 around which a supporting part 22 of a photo-electric cell 23 is pivotable. The supporting part 22 of the cell 23 carries a toothed segment 24 the teeth of which are cooperating with a gear wheel 28 journalled on the extension piece 25 so as to be pivotable around the axle 26 and meshing with the toothed segment 27 fixed on the camera casing 14. On both sides of the photo-cell 28 screens 29, 30 are provided which are pivotable around their relative axles 31 and loaded by springs 32 tending to deflect the screens inwards below the bed 17.

If the camera bed 17 is opened, the gear wheel 28 rolls on the fixed toothed segment 27 and sets the toothed segment 24 together with the photo-cell 23 into the position traced on Fig. 1. In this position the photo-cell 23 is protected against all rays coming from above as well as against those coming from the side, other than those coming from the object to be photographed. If the bed is pivoted in the upward direction, i. e., is closed, the setting mechanism composed of the toothed segments 27 and 24 and of the gear wheel 28 will become displaced in the opposite sense, so that the photo-cell 23 will be pivoted back into the recess 33 of the bed 17 and the screens 29, 30 will under the action of the springs 32 place themselves above the carrier 22 of the photo-cell. The recess 33 is surrounded on all four sides by laths 34, 35, so that the photo-cell will in this position i. e. with the camera closed, be protected against any incidence of light. The camera bed 17 is journalled pivotably, in a manner per se known, on the axle 37 by means of hinges 36.

Figure 3:
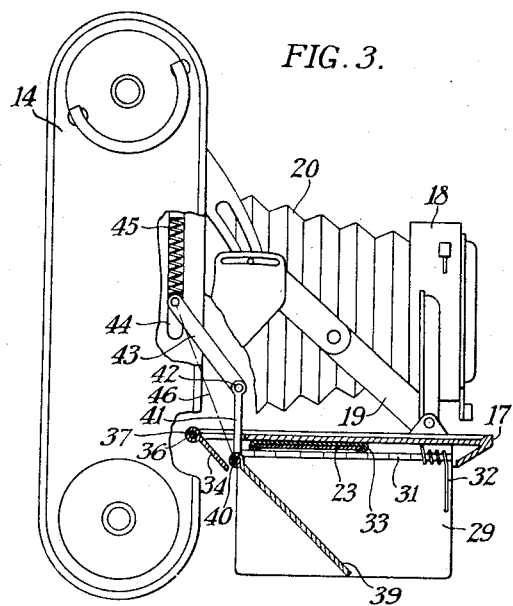
Fig. 3 is a side elevation and Fig. 4 a front elevation of another embodiment.
Figure 4:
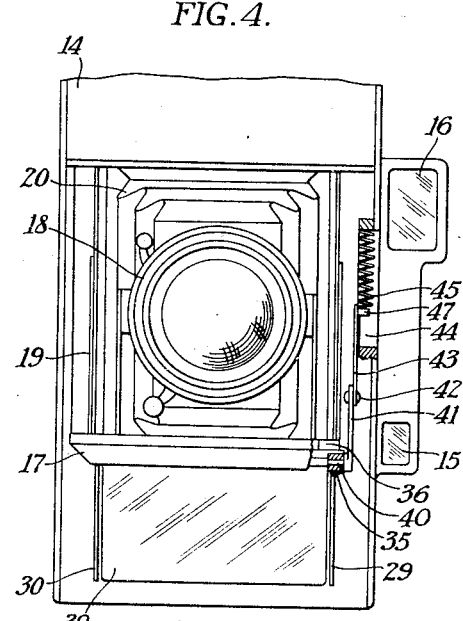

In the case of the embodiment according to Figs. 3 and 4 the photo-cell 23 is arranged in a carrier 33 which is fixed on the bed 17 of the camera. When the camera is open light is directed to the photo-cell by a mirror 39 which is arranged so as to be pivotable around the axle 40 provided in the bed 17. The mirror 39 carries an arm 41 which is connected through an articulation 42 with the rod 43. The other end of the rod 43 is guided in a slot 44 of the camera casing 14 and is subjected to the action of a compression spring 45.

If the camera bed 17 is closed, the arm 41 will become pivoted towards the left and as soon as the articulation 42 reaches the other side of the connecting line 46 of the pivots 40 and 47, the spring 45 will become discharged and will pivot the mirror 39 into the recess 33 of the bed 17, so that the mirror 39 will cover the photo-cell 23. When opening the bed 17, the mirror 39 will be displaced in a similar manner into the position traced on the drawing by means of the setting mechanism 42, 43, and 45. Alongside the mirror there are arranged, in the case of this embodiment also, screens 29 and 30, fitted with springs 32 in the same way as in the case of the embodiments according to Figs. 1 and 2. If, when closing the bed 17 the mirror is folded down on the photo-cell by the setting mechanism 41, 43 and 47 described, the screens 29 and 30 will under the pressure of the springs 32 become placed over the mirror.

It is thus evident that the invention as described above provides a compact and convenient arrangement for a folding camera whereby a light-sensitive cell is protected while the camera is in folded position, and when the camera is opened for use the cell is exposed to light coming from the field to be photographed and shielded from light coming from outside such field.

What I claim is:

In a folding camera, a bed member movable from a vertical closed position to a horizontal position in which the camera is open for use, a photo cell pivotally mounted on the bed member for movement from a position flat against and facing said member to a position perpendicular to said member, means operative upon the movement of said member to open position for moving said cell from its flat position to its perpendicular one with respect to the bed member, said means comprising a pinion rotatably mounted on an arm secured to the bed member and positioned between and meshing with a stationary gear segment secured to the camera body and a gear segment secured to and movable with the cell and screening means for protecting the cell from laterally incident light in open camera position and for covering the cell in closed camera position, the position of the screening means being controlled by the change in position of the cell.

ÖDÖN RISZDORFER.